(12) United States Patent
Panda et al.

(10) Patent No.: US 9,659,578 B2
(45) Date of Patent: May 23, 2017

(54) COMPUTER IMPLEMENTED SYSTEM AND METHOD FOR IDENTIFYING SIGNIFICANT SPEECH FRAMES WITHIN SPEECH SIGNALS

(71) Applicant: Tata Consultancy Services Ltd., Mumbai, Maharashtra (IN)

(72) Inventors: Ashish Panda, Mumbai (IN); Sunil Kumar Kopparapu, Mumbai (IN)

(73) Assignee: TATA CONSULTANCY SERVICES LTD., Mumbai (IN)

(*) Notice: Subject to any disclaimer, the term of this patent is extended or adjusted under 35 U.S.C. 154(b) by 181 days.

(21) Appl. No.: 14/670,149

(22) Filed: Mar. 26, 2015

(65) Prior Publication Data
US 2016/0155441 A1 Jun. 2, 2016

(30) Foreign Application Priority Data
Nov. 27, 2014 (IN) .......................... 3786/MUM/2014

(51) Int. Cl.
*G10L 15/20* (2006.01)
*G10L 25/51* (2013.01)
*G10L 15/06* (2013.01)

(52) U.S. Cl.
CPC ............. *G10L 25/51* (2013.01); *G10L 15/06* (2013.01)

(58) Field of Classification Search
CPC ......... G10L 15/02; G10L 25/18; G10L 19/26; G10L 25/24; G10L 25/78; G10L 25/93; G10H 2210/041; G10H 2210/066; G10H 2250/031

USPC ............................ 704/500, 246, 205, 9, 233
See application file for complete search history.

(56) References Cited

U.S. PATENT DOCUMENTS

| | | | |
|---|---|---|---|
| 5,956,674 A * | 9/1999 | Smyth ................. | G10L 19/0208 704/200.1 |
| 7,177,808 B2 | 2/2007 | Yantorno | |
| 7,444,282 B2 * | 10/2008 | Choo ..................... | G10L 15/04 704/201 |

(Continued)

OTHER PUBLICATIONS

Hosseinzadeh et al., "On the Use of Complementary Spectral Features for Speaker Recognition," EURASIP Journal on Advances in Signal Processing, vol. 2008, Article ID 258184, Published Oct. 24, 2007, 10 pages.

(Continued)

*Primary Examiner* — Michael Colucci
(74) *Attorney, Agent, or Firm* — Blueshift IP, LLC; Robert Plotkin

(57) ABSTRACT

The present disclosure envisages a computer implemented system for identifying significant speech frames within speech signals for facilitating speech recognition. The system receives an input speech signal having a plurality of feature vectors which is passed through a spectrum analyzer. The spectrum analyzer divides the input speech signal into a plurality of speech frames and computes a spectral magnitude of each of the speech frames. There is provided a suitability engine which is enabled to compute a suitability measure for each of the speech frames corresponding to spectral flatness measure (SFM), energy normalized variance (ENV), entropy, signal-to-noise ratio (SNR) and similarity measure. The suitability engine further computes a weighted suitability measure for each of the speech frames.

23 Claims, 3 Drawing Sheets

(56) References Cited

U.S. PATENT DOCUMENTS

Figure 1:
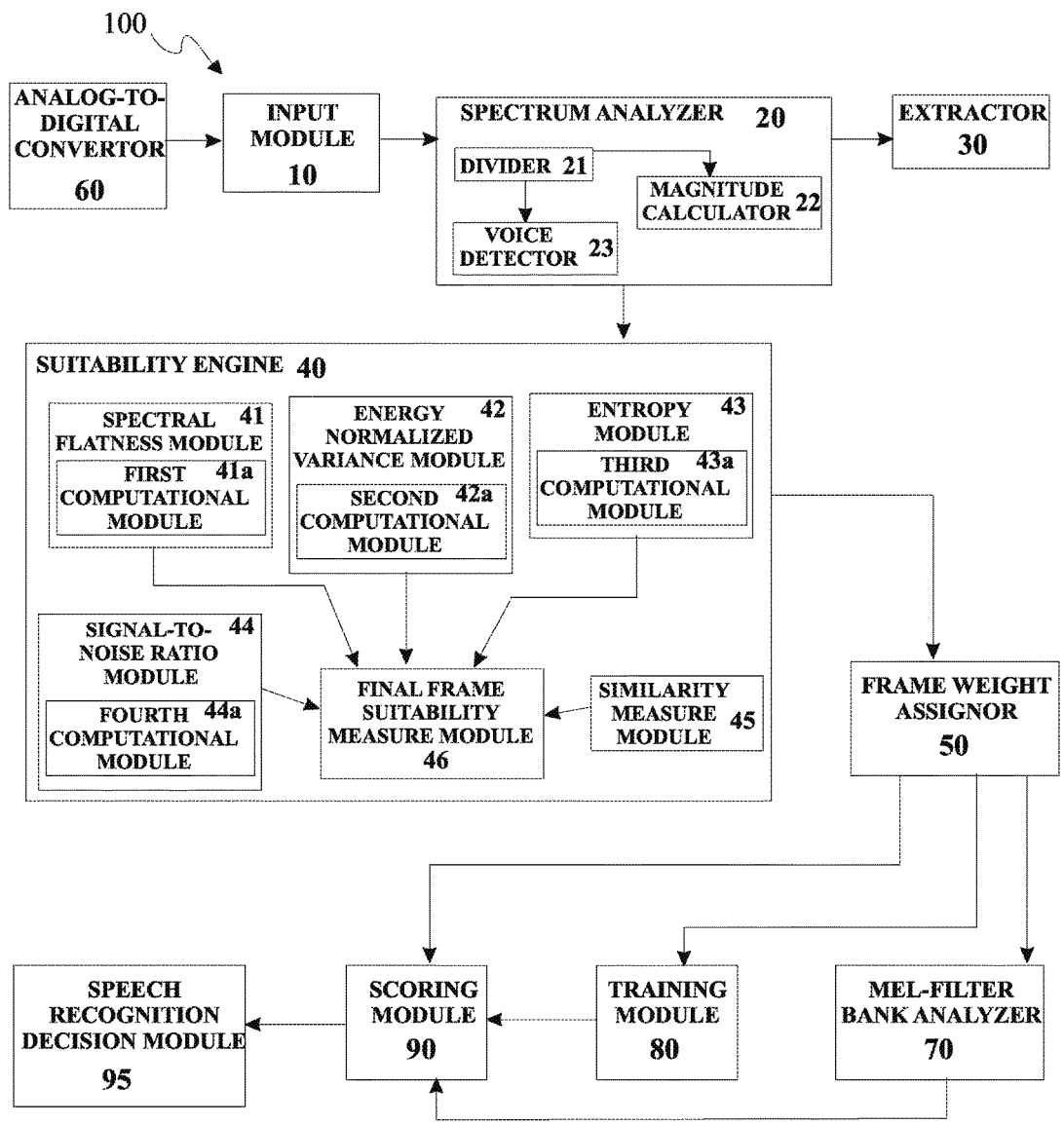

| | | | |
|---|---|---|---|
| 8,140,331 B2* | 3/2012 | Lou | G11B 27/28 704/205 |
| 8,229,744 B2* | 7/2012 | Dharanipragada | G10L 15/02 381/56 |
| 8,239,194 B1 | 8/2012 | Paniconi | |
| 8,412,525 B2* | 4/2013 | Mukerjee | G10L 15/142 704/233 |
| 8,577,678 B2* | 11/2013 | Nakadai | G10L 15/20 704/231 |
| 8,831,936 B2* | 9/2014 | Toman | G10L 21/0272 704/228 |
| 9,026,451 B1* | 5/2015 | Kleijn | G10L 19/26 348/607 |
| 2004/0064314 A1 | 4/2004 | Aubert | |
| 2006/0100866 A1 | 5/2006 | Alewine | |
| 2006/0270467 A1 | 11/2006 | Song | |
| 2008/0189104 A1 | 8/2008 | Zong | |
| 2009/0248411 A1 | 10/2009 | Konchitsky | |
| 2010/0286991 A1* | 11/2010 | Hedelin | G10L 19/035 704/500 |
| 2011/0060596 A1* | 3/2011 | Jax | G10L 19/24 704/500 |
| 2011/0191101 A1* | 8/2011 | Uhle | G10L 21/0208 704/205 |
| 2011/0282663 A1* | 11/2011 | Talwar | G10L 15/20 704/233 |
| 2012/0185243 A1* | 7/2012 | Fukuda | G10L 15/02 704/205 |
| 2012/0303369 A1* | 11/2012 | Brush | G10L 17/02 704/246 |
| 2013/0204617 A1* | 8/2013 | Kuo | H04R 3/002 704/233 |
| 2013/0253920 A1 | 9/2013 | Lin | |
| 2014/0180675 A1* | 6/2014 | Neuhauser | G06F 17/28 704/9 |
| 2014/0188487 A1* | 7/2014 | Perez Gonzalez | G10L 19/00 704/500 |
| 2015/0073780 A1* | 3/2015 | Sharma | G10L 25/12 704/205 |

OTHER PUBLICATIONS

Manohar, et al., Speech Enhancement in Nonstationary Noise Environments Using Noise Properties, Speech Communication, vol. 48, Issue 1, Jan. 2006, pp. 96-109.

Mathur et al., "Significance of Parametric Spectral Ratio Methods in Detection and Recognition of Whispered Speech," EURASIP Journal on Advances in Signal Processing, Jul. 2012, 20 pages.

* cited by examiner

COMPUTER IMPLEMENTED SYSTEM AND METHOD FOR IDENTIFYING SIGNIFICANT SPEECH FRAMES WITHIN SPEECH SIGNALS

FILED OF DISCLOSURE

The present disclosure relates to the field of speech recognition computing systems.

DEFINITIONS OF TERMS USED IN THE SPECIFICATION

The expression 'Spectral Flatness Measure (SFM)' used hereinafter in the specification refers to but is not limited to a tonality coefficient and a wiener entropy. The SFM is a measure used in digital signal processing for the purpose of characterizing a speech spectrum. Typically, the SFM is measured in decibels. The SFM is useful for discriminating between voiced and unvoiced components of a speech.

The expression 'Energy Normalized Variance (ENV)' used hereinafter in the specification refers to the trend in of energy distribution in a given speech. The ENV is capable of illustrating the dominant sub-band (or the frequency range) that is emphasized by a speaker for the given speech.

The expression 'Entropy' used hereinafter in the specification refers to a methodology used for speech detection in white or quasi-white noises.

The 'Signal-to-Noise Ratio (SNR)' used hereinafter in the specification refers to a methodology to measure that is used for comparing the level of a desired signal to the level of background noise. The SNR is a ratio of signal power to the noise power. Typically, the SNR is measured in decibels.

BACKGROUND

Speech recognition in computer science, ability of the computing machine/device or computing program to identify words and phrases spoken in a language and convert them to a machine-readable format. Speech recognition softwares enable users to dictate their devices. The devices installed with the speech recognition software first receive an analog signal and converts the analog signal into digital signal. Further, the speech recognition software processes the digital signal to determine the spoken words and phrases. Elementary speech recognition software has a limited vocabulary of words and phrases and may only identify words and phrases if they are spoken very clearly. However, it has been observed that the factor such as low signal-to-noise ratio, overlapping speech, intensive use of computer power, and homonyms reduces the accuracy of the speech recognition software. The available speaker recognition and speech recognition softwares typically employ Mel-frequency-cepstrum coefficients (MFCC) as the feature representation of human speech. MFCCs are usually derived by digitizing the speech and applying a shifting window to obtain short-term frames and compute Fast Fourier Transform (FFT) spectrum, calculate filter band energy output where the center frequencies of the bands are Mel-frequency distributed, and finally use Discrete Cosine Transform (DCT) to produce Mel-frequency cepstrum coefficients (MFCC). There is one vector of MFCC's for each frame. MFCC's can be augmented by their first-order and second-order derivatives (expanded feature vectors) to enhance the recognition performance for speaker and speech recognition. Moreover, each MFCC can also be mean-removed in order to mitigate, e.g., channel distortion. The above MFCC's and their expansion and/or normalization work best in a quiet environment where training and testing conditions match. For noisy environments the aforementioned methodologies proves to give an undesired result. Further, it has been also observed that there are no available softwares which are capable of providing the best desired result for both quiet and noisy environments. For example, in noise-robust speech recognition softwares, generally yields degraded recognition accuracies when operating in a quiet condition and when compared to a non-noise robust counterpart. The conventional speech recognition softwares are subject to a variety of problems such as the capability of mitigating noise interference and of separating inter-speaker variability from channel distortion.

There is a long felt need for a computer implemented system and method which will enable the conventional softwares to provide the desired speech recognition yield in both the quiet and noisy environments by identifying significant speech frames within speech signals.

OBJECTS

Some of the objects of the present disclosure, aimed at ameliorating one or more problems of the prior art, are described herein below:

An object of the present disclosure is to provide a system and method for identifying significant speech frames within speech signals.

Yet another object of the present disclosure is to provide a system that is capable of identifying significant speech frames in both quiet and noisy environment.

Still further, an object of the present disclosure is to provide a system that is enabled to identify a speech frame by computing a weighted suitability measure.

One more object of the present disclosure is to provide a system that is enabled compute the suitability measure based on a spectral flatness measure, an energy normalized variance, an entropy, a signal-to-noise ratio and a similarity measure.

Further, an object of the present disclosure is to provide a system that is enabled to determine the suitability measure based on spectral characteristics of the speech frames.

Yet another object of the present disclosure is to provide a system that is capable of marking speech frames as voiced speech frames and non-voiced speech frames.

Another object of the present disclosure is to provide a system that is enabled to compute the suitability measure for the purpose of developing better training models and scoring models for better speech/speaker recognition.

Other objects and advantages of the present invention will be more apparent from the following description when read in conjunction with the accompanying figures, which are not intended to limit the scope of the present disclosure.

SUMMARY

The present disclosure envisages a computer implemented system for identifying significant speech frames within speech signals for facilitating speech recognition. The system receives at least an input speech signal a plurality of feature vectors. The input speech signal is passed through a spectrum analyzer which is enabled to divide the input speech signal into a plurality of speech frames Further, the spectrum analyzer computes a spectral magnitude of each of the speech frames. There is provided a suitability engine cooperating with the spectrum analyzer to receive the spectral magnitude of each of the speech frames and to compute a suitability measure for the speech frames corresponding to spectral flatness measure (SFM), energy normalized variance (ENV), entropy, signal-to-noise ratio (SNR) and similarity measure computed by the respective modules. The suitability engine and a frame weight assigner receive the spectral magnitude of each of the speech frames from the spectrum analyzer. The frame weight assigner is enabled to compute at least a weight for each of the suitability measures corresponding to the speech frames to identify significant speech frames based on the spectral magnitude and the final suitability measure of respective speech frame.

BRIEF DESCRIPTION OF THE ACCOMPANYING DRAWINGS

Figure 2A:
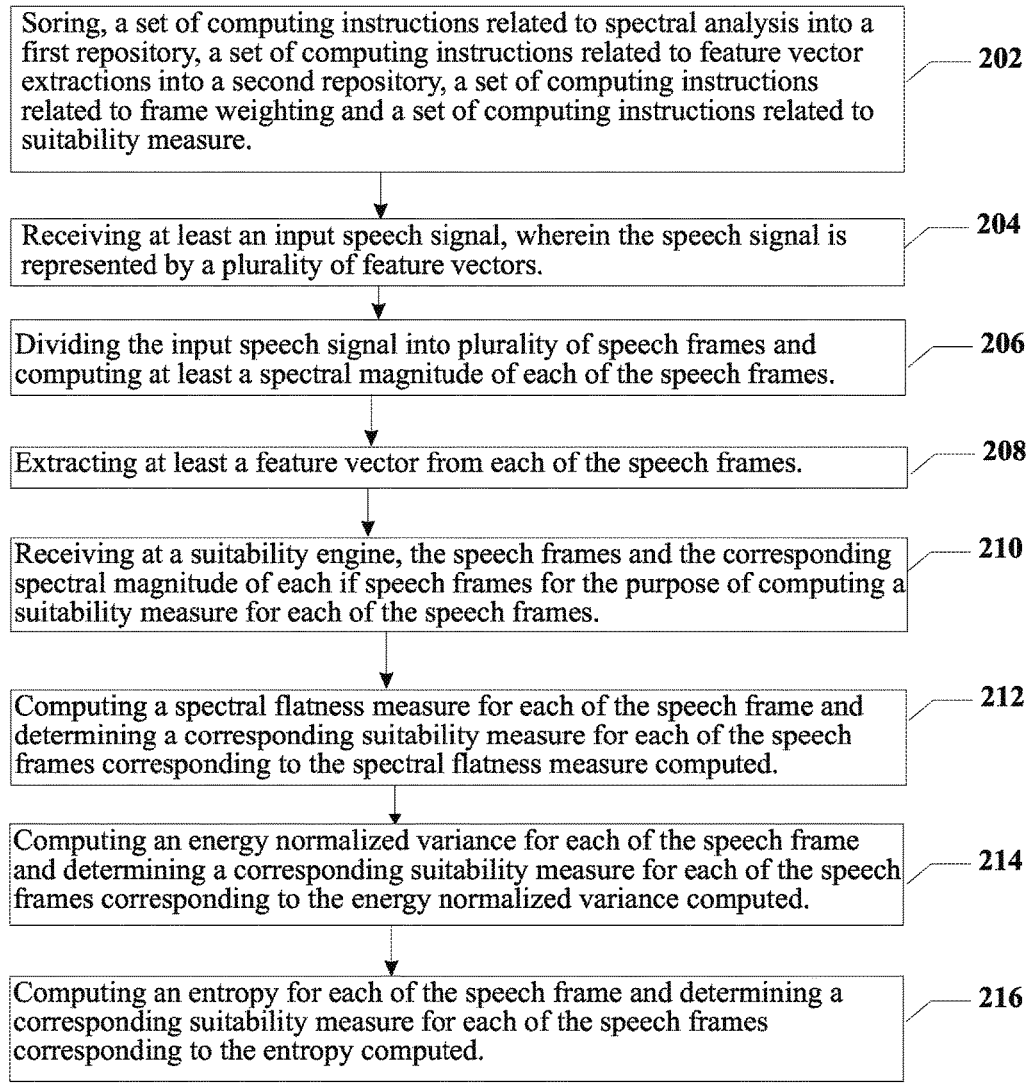
Figure 2B:
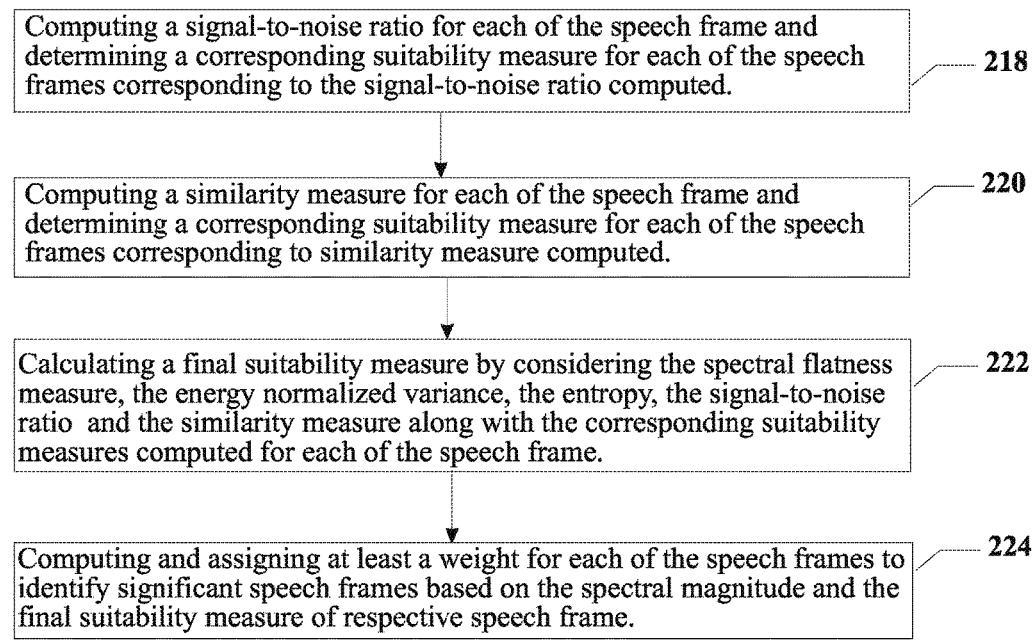

The computer implemented system and method for identifying significant speech frames within speech signals will now be explained with respect to the non-limiting accompanying drawings which do not restrict the scope and ambit of the present disclosure. The drawings include:

FIG. 1 illustrating a system-level block diagram of the components of the system, in accordance with the present disclosure; and FIGS. 2(a) and 2(b) illustrating the steps involved in the flowchart corresponding to a method for identifying significant speech frames within speech signals for facilitating speech recognition, in accordance with the present disclosure.

DETAILED DESCRIPTION

The conventional speaker recognition and speech recognition computer applications, typically, employ Mel-frequency-cepstrum coefficients (MFCC) as the feature representation of human speech. MFCCs are usually derived by digitizing the speech and applying a shifting window to obtain short-term frames and compute Fast Fourier Transform (FFT) spectrum, calculate filter band energy output where the center frequencies of the bands are Mel-frequency distributed, and finally use Discrete Cosine Transform (DCT) to produce Mel-frequency cepstrum coefficients (MFCC). There is one vector of MFCC's for each frame. MFCC's can be augmented by their first-order and second-order derivatives (expanded feature vectors) to enhance the recognition performance for speaker and speech recognition. Moreover, each MFCC can also be mean-removed in order to mitigate, e.g., channel distortion. The above MFCC's and their expansion and/or normalization work best in a quiet environment where training and testing conditions match. For noisy environments, improvements have been achieved by incorporating some noise-robust algorithms, such as spectral subtraction.

To obviate the drawbacks associated with aforementioned systems and methods, the present disclosure envisages a computer implemented system and method for identifying significant speech frames within speech signals for facilitating speech recognition.

Referring to FIG. 1, there is shown a computer implemented system 100 capable of for identifying significant speech frames within speech signals for facilitating speech recognition.

The system 100 includes but is not limited to an input module 10, a spectrum analyzer 20, an extractor 30, a suitability engine 40, and a frame weight assigner 50, an analog-to-digital convertor 60, a mel-filter-bank analyzer 70, a training module 80, and a scoring module 90. The analog-to-digital convertor 60 receives at least a input speech signal is analog format and further enabled to process and convert the received analog input speech signal into a digital format. The input module 10 of the system 100 is interfaced with the analog-to-digital convertor 60 for the purpose of receiving the input speech signal in digital format for further processing. The input speech signal in digital format received from the analog-to-digital convertor 60 is represent by a plurality of feature vectors.

In accordance with the present disclosure, the spectrum analyzer 20 cooperates with the input module 10 to receive the input speech signal represented by the plurality of feature vectors. The spectrum analyzer 20 may include a divider referred by the reference numeral 21 and a magnitude calculator referred by the reference numeral 22. The divider 21 is enabled to divide the input speech signal into plurality of speech frames. Once, the divider 21 has completed the job of dividing and disintegrating the input speech signal into one or more than one speech frames, the magnitude calculator 22 of the spectrum analyzer 20, receives the speech frames by cooperating with the divider 21. The magnitude calculator 22 is enabled to compute a spectral magnitude of each of the speech frames. Further, once the computation of the spectral magnitudes of each of the speech frames is complete, the spectrum analyzer 20 communicates the speech frames along with their corresponding spectral magnitudes to the extractor 30. The extractor 30 cooperates with the spectrum analyzer 20 to receive the speech frames. The extractor 30 is enables to extract at least a feature vector from each of the speech frames to be utilized in the processing of the speech frames for facilitating speech recognition. In an embodiment of the present disclosure, the spectrum analyzer 20 may include a voice detector referred by the reference numeral 23. The voice detector 23 is enabled to cooperate with the divider voice detector 21 to receive the plurality of speech frames produced from the input speech signal. The voice detector 23 identifies and labels each voiced and non-voiced speech frames produced by the divider 21.

In accordance with the present disclosure, the suitability engine 40 cooperates with the spectrum analyzer 20 for the purpose of receiving the speech frames with their spectral magnitudes corresponding to each of the speech frames. The suitability engine 40 computes a suitability measure for each of the speech frames. In another embodiment, the suitability engine 40 may be enabled to compute the suitability measure for at least one speech frame or for a group of speech frames or sub-bands at a time. In an embodiment, the suitability engine 40 may include a spectral flatness module 41, an energy normalized variance module 42, an entropy module 43, a signal-to-noise ratio module 44, a similarity measure module 45 and a final suitability measure module 46.

The spectral flatness module 41 receives the spectral magnitudes of each of the speech frames to be utilized for the computation of a spectral flatness measure to determine a first suitability measure for each of the speech frames. In an embodiment, the spectral flatness measure (SFM) is defined as the ratio of the geometric mean to the arithmetic mean of the spectral magnitudes of the speech frames.

SFM ($\zeta_t$) for a speech frame in a given instance (t) is calculated using equation 1:

$$\zeta_t = \frac{\left(\prod_{k=b}^{e} X[k]\right) \wedge (1/L)}{\frac{1}{L}\sum_{k=b}^{e} X[k]} \quad \text{eq. 1}$$

wherein, b and e represents a first limit and a last limit of the frequency bins, L represents the number of frequency bins and X[k] represents the spectral magnitude of the speech frame at frequency bin k.

The SFM ($\zeta_t$) takes values in the range of [0, 1] with high values indicating noise like quality of the speech frame. SFM may be computed over the entire frequency spectra or over a sub-band of frequency spectrum. If the SFM is computed over sub-bands, then the SFM for the speech frame may be computed as a weighted summation of the SFMs for each sub-band. SFM may also be computed over a plurality of frames. In such cases, the SFM for a frame may be computed by taking the weighted average of SFM values of the neighborhood speech frames of the selected speech frame or sub-band. Once the SFM for the speech frame is computed, the first suitability measure can be assigned to the speech frame may be inversely proportional to the SFM value.

The spectral flatness module 41 further may include a first computation module referred by the reference numeral 41a. The first computation module 41a computes a first multiplication factor (m1) using the equation 2:

$$m1 = \Sigma_{t=1}^{T}(\zeta_t^{-1})^{-1} \quad \text{eq. 2}$$

Based on the SFM ($\zeta_t$) computed by the spectral flatness module 41 and the first multiplication factor (m1), the first suitability measure (S1) is calculated using the following equation 3:

$$S1 = m1 \cdot (\zeta_t)^{-1} \quad \text{eq. 3}$$

where, $\zeta_t$ represents spectral flatness measure and t represents time instance of the speech frame.

The energy normalized variance module 42 receives the spectral magnitude of each of the speech frames and computes an energy normalized variance to determine a second suitability measure for each of the speech frames. In an embodiment, the energy normalized variance (ENV) is defined as the ratio of the variance to the energy of the spectral magnitude of the speech frames. The ENV ($\sigma_t$) for a speech frame in a given instance (t) is calculated using equation 4:

$$\sigma_t = \frac{\sum_{k=b}^{e}(X[k] - \overline{X})^2}{\sum_{k=b}^{e}(X[k])^2} \quad \text{eq. 4}$$

where, b and e represents a first limit and a last limit of the frequency bins, L represents the number of frequency bins, X[k] represents the spectral magnitude of the speech frame at frequency bin k and $\overline{X}$ represents the mean of the spectral magnitude. In an embodiment, the ENV takes low value for noise dominated regions and high value for speech dominated regions. The ENV can be computed over the entire spectral range or over sub-bands. If ENV is computed over sub-bands, a final ENV for the frame can be computed by a weighted sum of the sub-band ENV values. If the ENV is computed for a plurality of frames, then ENV for a speech frame may be computed by taking a weighted average of ENV value of the neighborhood speech frames. Once the ENV for a frame is computed, the second suitability measure is assigned to the speech frame may be directly proportional to the ENV value computed.

The energy normalized variance module 42 further may include a second computation module referred by the reference numeral 42a. The second computation module 42a computes a second multiplication factor (m2) using the equation 5:

$$m2 = \Sigma_{t=1}^{T}(\sigma_t)^{-1} \quad \text{eq. 5}$$

Based on the ENV ($\sigma_t$) computed by the energy normalized variance module 42 and the second multiplication factor (m2), the second suitability measure (S2) is calculated using the following equation 6:

$$S2 = m2 \cdot \sigma_t \quad \text{eq. 6}$$

where ($\sigma_t$) represents energy normalized variance and t represents time instance of the speech frame.

The entropy module 43 receives the spectral magnitude of each of the speech frames and computes an entropy to determine a third suitability measure for each of the speech frames. The entropy ($H_t$) is calculated by using the equation 7:

$$H_t = -\frac{1}{\log(L)}\sum_{k=b}^{e} p(|X[k]|^2) \cdot \log p(|X[k]|^2) \quad \text{eq. 7}$$

where, p is calculated using the equation 8:

$$p(|X[k]|^2) = \frac{|X[k]|^2}{\sum_{k=b}^{e}|X[k]|^2} \quad \text{eq. 8}$$

In an embodiment, the entropy value $H_t$ approaches 1 for white noise and 0 for speech. The entropy can be computed over the entire spectral range or over sub-bands. If the entropy is computed for sub-bands, then an entropy value for the frame may be computed by taking a weighted sum of the entropy values for each sub-band. Entropy value for a frame may also be computed by taking a weighted average of the entropy values of the neighborhood speech frames. The third suitability measure assigned to the speech frame may be inversely proportional the entropy value computed.

The entropy module 43 further may include a third computation module referred by the reference numeral 43a. The third computation module 43a computes a third multiplication factor (m3) using the equation 9:

$$m3 = \Sigma_{t=1}^{T}(H_t^{-1})^{-1} \quad \text{eq. 9}$$

Based on the entropy ($H_t$) computed by the entropy module 43 and the third multiplication factor (m3), the third suitability measure (S3) is calculated using the following equation 10:

$$S3 = m3 \cdot (H_t)^{-1} \quad \text{eq. 10}$$

where ($H_t$) represents entropy and t represents time instance of the speech frame.

The signal-to-noise ratio module 44 receives the spectral magnitude of each of the speech frames and computes a frame level signal-to-noise ratio to determine a fourth suitability measure for each of the speech frames. In an embodiment, the signal-to-noise ratio module 44 accepts a noise estimation of the speech frames to compute a frame level signal-to-noise ratio.

The signal-to-noise Ratio (SNR) is derived from the ratio of the signal energy to the noise energy. The SNR ($\rho_t$) is measured in decibels (dB) and is calculated using equation 11:

$$\rho_t = 20 \cdot \log_{10} \frac{\sum_{k=b}^{e} |X[k]|^2}{\sum_{k=b}^{e} |N[k]|^2} \qquad \text{eq. 11}$$

where, N[k] is the spectral magnitude of the speech frame, typically corresponds to a noise signal at frequency bin k. However, the noise signal can be estimated by a microphone kept at some distance from the microphone capturing the speech signal at the first instance. In one embodiment, the SNR value may be computed by first identifying the noise dominated sub-bands of a speech frame and speech like sub-bands of a frame and then by taking a ratio of speech like sub-band to noise-like sub-band of the speech frame. The speech and noise decision for a sub-band may be made by using any or all of the aforementioned measures such as SFM, ENV or entropy values. In another embodiment, the SNR value of the speech frame may also be computed by taking a weighted average of SNR values of the neighborhood speech frames. The fourth suitability measure may be assigned to the speech frame may be directly proportional to the speech frame SNR value computed.

The signal-to-noise ratio module 44 further may include a fourth computation module referred by the reference numeral 44a. The fourth computation module 44a computes a fourth multiplication factor (m4) using the equation 12:

$$m4 = \Sigma_{t=1}^{T} (\rho_t)^{-1} \qquad \text{eq. 12}$$

Based on the signal-to-noise ratio ($\rho_t$) computed by the signal-to-noise ratio module 44 and the fourth multiplication factor (m4), the fourth suitability measure (S4) is calculated using the following equation 13:

$$S4 = m4 \cdot \rho_t \qquad \text{eq. 13}$$

where ($\rho_t$) represents frame level signal-to-noise ratio and t represents time instance of the speech frame.

The similarity measure module 45 receives the spectral magnitude of each of the speech frames and computes a similarity measure to determine a fifth suitability measure for each of the speech frames. In an embodiment, the similarity measure module 45 accepts at least a pre-trained speech model and at least a pre-trained noise model to compute the similarity measure. The similarity measure is a likelihood score, between the speech frame and a pre-trained general speech or noise model. If a speech frame has a high similarity score with a speech model and low similarity score with a noise model, then it is likely to be a speech like speech frame. In an embodiment, the similarity score of the speech frame may also be computed by taking a weighted average of similarity score with a plurality of speech or noise models. The similarity score may also be determined over the neighborhood of the speech frame. The fifth suitability measure assigned to the speech frame may be directly proportional to the similarity score with the speech model and inversely proportional to the similarity score with the noise model computed by the similarity measure module.

The final suitability measure module 46 cooperates with the spectral flatness module 41, the energy normalized variance module 42, the entropy module 43, the signal-to-noise ratio module 44 and the similarity measure module 45 to receive the computed spectral flatness measure (SFM) value, the energy normalized variance value, the entropy value, the signal-to-noise ratio (SNR) value and the similarity measure and their corresponding suitability measures computed for each of the speech frames respectively. The final suitability measure module 46 is enabled to compute a final suitability measure for each of the speech frames. The final suitability measures and frame weights of the speech frames ranges between 0 to 1, wherein 0 corresponds to a speech frame unsuitable for speech recognition and 1 corresponds to a speech frame totally suitable for speech recognition.

In accordance with the present disclosure, the frame weight assigner 50 of the system 100, enabled to cooperate with the spectrum analyzer 20 to receive the spectral magnitude of each of the speech frames and the suitability engine 40 to receive the final suitability measure corresponding to each of the speech frames. Further, the frame weight assignor 50 computes weight for each of the speech frames to identify significant speech frames based on the spectral magnitude and the final suitability measure of respective speech frames. In an embodiment, the final suitability measure for the speech frame may also be arrived at by taking into consideration two or more of the above-mentioned methods. In one embodiment, to compute suitability measures S1, S2, S3 and S4 as illustrated above using different modules such as spectral flatness module 41, the energy normalized variance module 42, the entropy module 43, and the signal-to-noise ratio module 44. The final suitability measure (S) may be computed as a weighted average of the obtained first suitability measure, second suitability measure, third suitability measure and fourth suitability measure. The final suitability measure (S) is calculated by using equation 14:

$$S = \frac{1}{\sum_i w_i} \sum_i w_i S_i \qquad \text{eq. 14}$$

where, the weight ($w_i$) may be proportional to the suitability measures (S1, S2, S3 and S4), which may be assigned to the speech frame. Such weights may be normalized by their sum so that the summation of the weights assigned to all the speech frames is 1. These weights may, then, be used in scoring and training procedures to alter the contribution of the speech frame in speech recognition. In an exemplary embodiment, a set of frames $X = \{\vec{x}_1, \vec{x}_2, \ldots, \vec{x}_T\}$ are assigned weights that are $\{w_1, w_2, \ldots, w_T\}$ respectively. Below, shown one of the ways to alter the speech frame contribution to the computation of likelihood score p(X|λ) represented in the below mentioned equation 15:

$$p(X|\lambda) = \Pi_{t=1}^{T} w_t p(\vec{x}_t|\lambda) \qquad \text{eq. 15}$$

where, λ is a model against which the speech frames are matched. Similarly, in the equations of the Expectation Maximization (EM) algorithm, the posteriori probability, $\gamma_t(i)$, of state i, given a frame $\vec{x}_t$, may be altered using equation 16:

$$\gamma_t(i) = \frac{w_t p(\vec{x}_t|i, \lambda)}{\sum_i w_t p(\vec{x}_t|i, \lambda)} \qquad \text{eq. 16}$$

In addition, the mel-filter-bank analyzer 70 of the system 100, cooperates with the spectrum analyzer 20. The Mel-filter-bank analyzer 70 analyzes and generates at least a Mel frequency cepstral coefficient (MFCC) for each of the speech frames for a time instance (t). The training module 80 cooperates with the mel-filter-bank analyzer 70 and the frame weight assigner 50. The training module 80 generates at least a training model based on the computed MFCC and the weight(s) assigned of the speech frame received from the frame weight assigner 50. The scoring module 90 cooperates with the mel-filter-bank analyzer 70, the training module 80 and the frame weight assigner 50. The scoring module 90 generates an output for a speech recognition decision module 95 for the purpose of identifying the potential speech frame. In accordance with the present disclosure, the system 100 is not restricted to the MFCC based features but may also include features derived from the spectrum of a speech signal.

Referring to FIGS. 2(*a*) and 2(*b*), there is shown a flow chart illustrating the steps involved in a method 200 for identifying significant speech frames within speech signals for facilitating speech recognition. The method, in accordance with the present disclosure comprising the following steps:

storing, a set of computing instructions related to spectral analysis into a first repository, a set of computing instructions related to feature vector extractions into a second repository, a set of computing instructions related to frame weighting and a set of computing instructions related to suitability measure 202;

receiving at least an input speech signal, wherein the speech signal is represented by a plurality of feature vectors 204;

dividing the input speech signal into plurality of speech frames and computing at least a spectral magnitude of each of the speech frames 206;

extracting at least a feature vector from each of the speech frames 208;

receiving at a suitability engine, the speech frames and the corresponding spectral magnitude of each if speech frames for the purpose of computing a suitability measure for each of the speech frames 210:

computing a spectral flatness measure for each of the speech frame and determining a corresponding suitability measure for each of the speech frames corresponding to the spectral flatness measure computed 212;

computing an energy normalized variance for each of the speech frame and determining a corresponding suitability measure for each of the speech frames corresponding to the energy normalized variance computed 214;

computing an entropy for each of the speech frame and determining a corresponding suitability measure for each of the speech frames corresponding to the entropy computed 216;

computing a signal-to-noise ratio for each of the speech frame and determining a corresponding suitability measure for each of the speech frames corresponding to the signal-to-noise ratio computed 218;

computing a similarity measure for each of the speech frame and determining a corresponding suitability measure for each of the speech frames corresponding to similarity measure computed 220;

calculating a final suitability measure by considering the spectral flatness measure, the energy normalized variance, the entropy, the signal-to-noise ratio and the similarity measure along with the corresponding suitability measures computed for each of the speech frames 222; and computing and assigning at least a weight for each of the speech frames to identify significant speech frames based on the spectral magnitude and the final suitability measure of respective speech frame 224.

In accordance with the present disclosure, the method further comprises:

generating and transmitting, at a mel-filter-bank analyzer, at least a mel frequency cepstral coefficient (MFCC) for each of the speech frames for a time instance (t);

receiving and generating, at a training module, at least a training model based on the computed MFCC and the weight assigned to each of the speech frames;

receiving the training model, at a scoring module, and generate an output for a speech recognition decision module for identifying the potential speech frame.

In accordance with the present disclosure, the step of computing the similarity measure for each of the speech frame further includes the step of accepting at least a pre-trained speech model and at least a pre-trained noise model for computing the similarity measure.

In accordance with the present disclosure, the step of computing the energy normalized variance for each of the speech frame further includes the step of accepting a noise estimation of the speech frames to compute a frame level signal-to-noise ratio.

In accordance with the present disclosure, the step of dividing the input speech signal into plurality of speech frames further includes the step of identify and labeling each voiced and non-voice speech frame.

Technical Advancements

The technical advancements of the computer implemented system and method for identifying significant speech frames within speech signals as envisaged by the present disclosure include the realization of:

a system and method for identifying significant speech frames within speech signals;

a system that is capable of identifying significant speech frames in both quiet and noisy environment;

a system that is enabled to identify a speech frame by computing a weighted suitability measure;

a system that is enabled compute the suitability measure based on a spectral flatness measure, an energy normalized variance, an entropy, a signal-to-noise ratio and a similarity measure;

a system that is enabled to determine the suitability measure based on spectral characteristics of the speech frames;

a system that is capable of marking speech frames as voiced speech frames and non-voiced speech frames; and a system that is enabled to compute the suitability measure for the purpose of developing better training models and scoring models for better speech/speaker recognition.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A computer implemented system for identifying significant speech frames within speech signals for facilitating speech recognition, said system comprising:
   a memory configured to store instructions and data;
   a processor configured to receive said instructions and data from said memory;
   an input module configured to accept at least an input speech signal, wherein the speech signal is represented by a plurality of feature vectors;
   a spectrum analyzer cooperating with said input module to receive the input speech signal, said spectrum analyzer comprises a divider configured to divide the input speech signal into a plurality of speech frames, said spectrum analyzer further configured to compute a spectral magnitude of each of the speech frames;
   an extractor cooperating with said spectrum analyzer to receive said speech frames, and configured to extract at least a feature vector from each of the speech frames;
   a suitability engine, of said computer, cooperating with the spectrum analyzer to receive the spectral magnitude of each of the speech frames and configured to compute a suitability measure for said speech frames, said suitability engine of said computer comprises:
   a spectral flatness module configured to receive the spectral magnitude of each of the speech frames and compute a spectral flatness measure to determine suitability measure for each of said speech frames;
   an energy normalized variance module configured to receive the spectral magnitude of each of the said speech frames and compute an energy normalized variance to determine suitability measure for each of said speech frames;
   an entropy module configured to receive the spectral magnitude of each of the said speech frames and compute entropy to determine a suitability measure for each of said speech frames;
   a signal-to-noise ratio module configured to receive the spectral magnitude of each of the said speech frames and compute a frame level signal-to-noise ratio to determine suitability measure for each of said speech frames;

a similarity measure module configured to receive the spectral magnitude of each of the said speech frames and compute a similarity measure to determine suitability measure for each of said speech frames;

a final suitability measure module configured to receive from the spectral flatness module, the energy normalized variance module, the entropy module, the signal-to-noise ratio module and the similarity measure module, the computed suitability measure based on the spectral flatness measure, the energy normalized variance, the entropy, the frame level signal-to-noise ratio and the similarity measure of each of said speech frames respectively, and configured to compute a final suitability measure for each of said speech frames; and a frame weight assigner, of said computer, cooperating with the spectrum analyzer to receive the spectral magnitude of each of said speech frames and the final suitability measure module provided in the suitability engine, of said computer, to receive the final suitability measure of each of said speech frames, and configured to compute weight for each of said speech frames to identify significant speech frames based on the spectral magnitude and the final suitability measure of respective speech frame.

2. The system as claimed in claim 1, wherein said system further comprises:

a mel-filter-bank analyzer cooperating with said spectrum analyzer, said mel-filter-bank analyzer configured to analyze and generate at least a mel frequency cepstral coefficient (MFCC) for each of the speech frames for a time instance (t);

a training module cooperating with said mel-filter-bank analyzer and said frame weight assigner of said computer, said training module configured generate at least a training model based on the computed MFCC and the weight of the speech frame received;

a scoring module cooperating with said mel-filter-bank analyzer, said training module and said frame weight assigner of said computer, and configured to generate output for a speech recognition decision module for identifying the potential speech frame.

3. The system as claimed in claim 1, wherein said similarity measure module is further configured to accept at least a pre-trained speech model and at least a pre-trained noise model to compute a similarity measure.

4. The system as claimed in claim 1, wherein said signal-to-noise ratio module is further configured to accept a noise estimation of said speech frames to compute a frame level signal-to-noise ratio.

5. The system as claimed in claim 1, wherein said spectrum analyzer further comprises a voice detector is configured identify and label each voiced and non-voice frame.

6. The system as claimed in claim 1, wherein the values of said final suitability measures and frame weights of said speech frames range from 0 to 1, where 0 corresponds to a speech frame unsuitable for speech recognition and 1 corresponds to a speech frame totally suitable for speech recognition.

7. The system as claimed in claim 1, wherein said spectral flatness module is configured to compute the spectral flatness measure ($\zeta_t$) of the speech frame over said plurality of speech frames for a time instance (t), said spectral flatness module further comprises a first computation module is configured to compute a first multiplication factor (m1), wherein m1 is represented by the equation: $m1 = \sum_{t=1}^{T}(\zeta_t^{-1})^{-1}$.

8. The system as claimed in claim 7, wherein said spectral flatness module is configured to compute a first suitability measure (S1) represented by the equation: $S1 = m1 \cdot (\zeta_t)^{-1}$, where $\zeta_t$ represents spectral flatness measure and t represents time instance of the speech frame.

9. The system as claimed in claim 1, wherein said energy normalized variance module is configured to compute the energy normalized variance ($\sigma_t$) of the speech frame over the plurality of speech frames for a time instance (t), said energy normalized variance module further comprises a second computation module is configured to compute a second multiplication factor (m2), wherein m2 is represented by the equation: $m2 = \sum_{t=1}^{T}(\sigma_t)^{-1}$.

10. The system as claimed in claim 9, wherein said energy normalized variance module configured to compute a second suitability measure (S2) represented by the equation: $S2 = m2 \cdot \sigma_t$, where $\sigma_t$ represents energy normalized variance value and t represents time instance of the speech frame.

11. The system as claimed in claim 1, wherein said entropy module is configured to compute the entropy ($H_t$) of the speech frame over the plurality of speech frames for a time instance (t), said entropy module further comprises a third computation module is configured to compute a third multiplication factor (m3), wherein m3 is represented by the equation: $m3 = \sum_{t=1}^{T}(H_t^{-1})^{-1}$.

12. The system as claimed in claim 11, wherein said entropy module is configured to compute a third suitability measure (S3) represented by the equation: $S3 = m3 \cdot (H_t)^{-1}$, where $H_t$ represents entropy value computed by the entropy module and t represents time instance of the speech frame.

13. The system as claimed in claim 1, wherein said signal-to-noise ratio module is configured to compute a frame level signal-to-noise ratio value ($\rho_t$) of the speech frame over the plurality of speech frames for the time instance (t), said signal-to-noise ratio module further comprises a fourth computation module is configured to compute a fourth multiplication factor (m4), wherein m4 is represented by the equation: $m4 = \sum_{t=1}^{T}(\rho_t)^{-1}$.

14. The system as claimed in claim 13, wherein said signal-to-noise ratio module is configured to compute a fourth suitability measure (S4) represented by the equation: $S4 = m4 \cdot \rho_t$, where $\rho_t$ represents frame level signal-to-noise ratio and t represents time instance of the speech frame.

15. The system as claimed in claim 1, wherein said similarity measure module is configured to compute a speech model ($d_s$) and a noise model ($d_n$) by accessing the speech model parameter and noise model parameter from a third repository, said similarity measure module is configured to the similarity measure value ($d_t$) of the speech frame over the plurality of speech frames for the time instance (t), said similarity measure module further comprises a fifth computation module is configured to compute a fifth multiplication factor (m5), wherein m5 is represented by the equation: $m5 = \sum_{t=1}^{T}(d_t)^{-1}$.

16. The system as claimed in claim 15, wherein said similarity measure module is configured to compute a fifth suitability measure (S5) represented by the equation: $S5 = m5 \cdot d_t$, where $d_t$ represents similarity measure value and t represents time instance of the speech frame.

17. The system as claimed in claim 1, wherein said final suitability measure module is configured to compute the final suitability measure ($S_t$) of the speech frame over the plurality of speech frames for the time instance (t) represented by the equation: $S_t=(\Sigma_i\alpha_i)^{-1}\cdot\Sigma_i\alpha_i S_t^i$, wherein $\alpha_i$ represents the weights assigned to each of the suitability measures computed corresponding to each of the spectral flatness measure, the energy normalized variance, the entropy, the frame level signal-to-noise ratio and the similarity measure, said frame weight assigner of said computer, further comprises a sixth computation module is configured to compute a sixth multiplication factor (m6), wherein m6 is represented by the equation: $m6=\Sigma_{t=1}^{T}(S_t)^{-1}$.

18. The system as claimed in claim 17, wherein the frame weight ($w_t$) computed by said frame weight assigner of said computer represented by the equation: $w_t=m6\cdot S_t$.

19. A computer implemented method for identifying significant speech frames within speech signals for facilitating speech recognition, said method comprising:
   storing instructions and data in a memory;
   receiving, using a processor, said instructions and data from said memory;
   storing, a set of computing instructions related to spectral analysis into a first repository, a set of computing instructions related to feature vector extractions into a second repository, a set of computing instructions related to frame weighting and a set of computing instructions related to suitability measure;
   receiving, by an input module, at least an input speech signal, wherein the speech signal is represented by a plurality of feature vectors;
   dividing, using a divider of a spectrum analyzer, the input speech signal into a plurality of speech frames and computing at least a spectral magnitude of each of the speech frames;
   extracting, using an extractor, at least a feature vector from each of the speech frames;
   receiving at a suitability engine of said computer, the speech frames and the corresponding spectral magnitude of each of speech frames for the purpose of computing a suitability measure for each of the speech frames:
      computing, by a spectral flatness module of said suitability engine, a spectral flatness measure for each of the speech frames and determining, by said spectral flatness module of said suitability engine, a corresponding suitability measure for each of the speech frames corresponding to the spectral flatness measure computed;
      computing, by an energy normalized variance module of said suitability engine, an energy normalized variance for each of the speech frame and determining, by said energy normalized variance module of said suitability engine, a corresponding suitability measure for each of the speech frames corresponding to the energy normalized variance computed;
      computing, by an entropy module of said suitability engine, an entropy for each of the speech frame and determining, by said entropy module of said suitability engine, a corresponding suitability measure for each of the speech frames corresponding to the entropy computed;
      computing, by a signal-to-noise ratio module of said suitability engine, a signal-to-noise ratio for each of the speech frame and determining, by said signal-to-noise ratio module of said suitability engine, a corresponding suitability measure for each of the speech frames corresponding to the signal-to-noise ratio computed;
      computing, by a similarity module of said suitability engine, a similarity measure for each of the speech frame and determining, by said similarity module of said suitability engine, a corresponding suitability measure for each of the speech frames corresponding to similarity measure computed;
      calculating, by a final suitability measure module of said suitability engine, a final suitability measure by considering the spectral flatness measure, the energy normalized variance, the entropy, the signal-to-noise ratio and the similarity measure along with the corresponding suitability measures computed for each of said speech frames; and
   computing and assigning, by a frame weight assigner of said computer, at least a weight for each of the speech frames to identify significant speech frames based on the spectral magnitude and the final suitability measure of respective speech frame.

20. The method as claimed in claim 19, wherein said method further comprising:
   generating and transmitting, at a mel-filter-bank analyzer, at least a mel frequency cepstral coefficient (MFCC) for each of the speech frames for a time instance (t);
   receiving and generating, at a training module, at least a training model based on the computed MFCC and the weight assigned to each of the speech frames;
   receiving the training model, at a scoring module, and generate an output for a speech recognition decision module for identifying the potential speech frame.

21. The method as claimed in claim 19, wherein the step of computing the similarity measure for each of the speech frame further includes a step of accepting at least a pre-trained speech model and at least a pre-trained noise model for computing the similarity measure.

22. The method as claimed in claim 19, wherein the step of computing the energy normalized variance for each of the speech frame further includes a step of accepting a noise estimation of said speech frames to compute a frame level signal-to-noise ratio.

23. The method as claimed in claim 19, wherein the step of dividing the input speech signal into plurality of speech frames further includes a step of identifying and labeling each voiced and non-voice speech frame.

* * * * *